(12) United States Patent
Heuser (10) Patent No.: US 10,313,366 B1
(45) Date of Patent: Jun. 4, 2019

(54) RETROACTIVE IDENTIFICATION OF PREVIOUSLY UNKNOWN MALWARE BASED ON NETWORK TRAFFIC ANALYSIS FROM A SANDBOX ENVIRONMENT

(71) Applicant: EMC IP Holding Company LLC, Hopkinton, MA (US)

(72) Inventor: Erik M. Heuser, Manassas, VA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 185 days.

(21) Appl. No.: 15/274,127

(22) Filed: Sep. 23, 2016

(51) Int. Cl.
*H04L 29/06* (2006.01)
*G06F 21/53* (2013.01)

(52) U.S. Cl.
CPC .......... *H04L 63/1416* (2013.01); *G06F 21/53* (2013.01); *H04L 63/145* (2013.01); *H04L 63/1433* (2013.01); *G06F 2221/033* (2013.01); *H04L 2463/121* (2013.01)

(58) Field of Classification Search
CPC ............. H04L 63/1416; H04L 63/1433; H04L 63/145; G06F 21/53
USPC .......................................................... 726/23
See application file for complete search history.

(56) References Cited

U.S. PATENT DOCUMENTS 9,165,142 B1 * 10/2015 Sanders ................ G06F 21/566
9,876,896 B1 * 1/2018 Gailloux ........... H04M 1/72577
2011/0314548 A1 * 12/2011 Yoo ......................... G06F 21/56 726/24
2012/0304244 A1 * 11/2012 Xie .......................... G06F 21/00 726/1
2014/0143869 A1 * 5/2014 Pereira .................. G06F 21/566 726/23
2016/0371495 A1 * 12/2016 Bhat ....................... G06F 21/53

* cited by examiner

*Primary Examiner* — Michael S McNally
(74) *Attorney, Agent, or Firm* — Ryan, Mason & Lewis, LLP (57) ABSTRACT

Techniques are provided for retroactively identifying malware programs when new signatures become available that later match network traffic previously obtained from the sandbox environment. An exemplary method comprises obtaining a plurality of packet capture files comprising previously captured network communications of malware programs that previously executed in a sandbox environment, wherein each of the packet capture files are associated with a corresponding malware program that generated the network communications; obtaining signatures indicative of at least one malware program; comparing the signatures to the packet capture files; and retroactively identifying a given malware program as malware if a signature matches a given packet capture file associated with the given malware program. A plurality of malware samples that were previously unidentified are optionally correlated with the given malware program based on a scan of additional packet capture files for the signature that matched the given packet capture file.

20 Claims, 8 Drawing Sheets

| NAME | SIGNATURE RULE (e.g., YaraRule) | USERNAME | STATUS | ENTRY DATE |
|---|---|---|---|---|
| Gh0st_Magic | rule Gh0st_Magic {<br>meta:<br>  author = "RSAIR"<br>strings:<br>  $a = "gh0st" nocase<br>condition:<br>  $a<br>} | erik | queued | 1455136920 |

| IDENTIFIER (e.g., MD5sum) | SIGN. NAME | USERNAME | ENTRY DATE |
|---|---|---|---|
| 2ecbcb147111c522246183c33c52b6d21 | Gh0st_Magic | erik | 1452704863 |
| 2ecbcb147111c522246183c33c52b6d21 | Gh0st_Magic | erik | 1452704863 |
| 5990f13dd74b033e894be22b4679d898 | Gh0st_Magic | erik | 1452704863 |
| 5990f13dd74b033e894be22b4679d898 | Gh0st_Magic | erik | 1452704863 |
| c0df09713ad74ab85e6587d7762313f2 | Gh0st_Magic | erik | 1452704864 |
| 0c878ee69a742bc89dada57418b35be7 | Gh0st_Magic | erik | 1452704864 |
| fa5809c1fb0b56ca5dc45de0534b1185 | Gh0st_Magic | erik | 1452704864 |
| 1ca637d38d814f7a98b0ed434fdbc1f4 | Gh0st_Magic | erik | 1452704864 |
| 1ca637d38d814f7a98b0ed434fdbc1f4 | Gh0st_Magic | erik | 1452704864 |
| 69b48e9c480f70e4c0f7848f32dba253 | Gh0st_Magic | erik | 1452704864 |
| 69b48e9c480f70e4c0f7848f32dba253 | Gh0st_Magic | erik | 1452704864 |
| f9c6440ce016985405585389356363 87 | Gh0st_Magic | erik | 1452704864 |
| 28e31081224229136eea7f900b479aff6 | Gh0st_Magic | erik | 1452704865 |
| 28e31081224229136eea7f900b479aff6 | Gh0st_Magic | erik | 1452704865 |
| 28e31081224229136eea7f900b479aff6 | Gh0st_Magic | erik | 1452704865 |

```
def main () :
    db_cursor = AcquireHandleToDatabase (username, password, host, port)
  max_jobs = 4
  if CheckRunningJobs (db_cursor) < max_jobs:
        signature, signature_name, user, entrydate = GetNewSignatureFromDatabase (db_cursor)
        dir = '/storage/'
        num_execs = QueryDatabaseForSandboxRuns ()
        for sample_id in range (1, num_execs) :
          sample_md5 = md5sum (read (open (dir + sample_id +/malware.exe, 'r'))).close()
          pcap = open(dir + sample id +/pcap/malware.pcp, 'r')
          result = ScanForResult (pcap, signature)
          pcap.close ()
          if result == True:
                AddIdentificationToDatabase (sample_md5, signature_name, user, db_cursor)
        SetStatusReported (db_crusor, signature_name, user, entrydate)
    db_cursor.close ()

def CheckRunningJobs (db_cursor) :
    db_cursor.execute ("SELECT * FROM NewSignatures WHERE Status = 'running' ")
  num_jobs = numrows (db_cursor)
    return num_jobs def AddIdentificationToDatabase (sample_md5, signature_name, user, db_cursor) :
    datatime = date.time ()
    db_cursor.execute (u ' ' '
      INSERT INTO SignatureMatches (MD5sum, YARAhit, Username, EntryDate)
      VALUES
      (%s, %s, %s) ' ' ' ,
        (sample_id, signature_name, user, datetime))
    return def GetNewSignatureFromDatabase (db_cursor) :
    signature, signature_name, user, entrydate = db_cursor.execute (\
  "SELECT YaraRule, Name, Username, Entrydate \
  FROM NewSignatures \
  WHERE Status = 'queued' ORDER BY EntryDate ASC LIMIT 1")
```

600

```
db_cursor.execute("UPDATE NewSignatures \
SET Status='running' \
WHERE Name = %s AND Username = %s AND Entrydate = %s", \
(signature_name, user, entrydate))

return signature, signature_name, user, entrydate def ScanForResult(pcap, signature) :
    return SomeScannerFunc(signature, pcap)

def SetStatusReported(db_cursor, signature_name, user, entrydate) :
    db_cursor.execute("UPDATE NewSignatures \
SET Status='reported' \
WHERE Name = %s AND Username = %s AND Entrydate = %s", \
(signature_name, user, entrydate) )

def AcquireHandleToDatabase(username, password, host, port) :
    return ConnectDB(username, password, host, port)
```

RETROACTIVE IDENTIFICATION OF PREVIOUSLY UNKNOWN MALWARE BASED ON NETWORK TRAFFIC ANALYSIS FROM A SANDBOX ENVIRONMENT

FIELD

The invention relates generally to computer networks, and more particularly, to techniques for improving security in a computer network.

BACKGROUND

A computer network typically incorporates security functionality to protect the computers of the network against malware and other malicious activity. Malware authors and threat intelligence researchers are constantly in a repeated cycle of obfuscation and detection, respectively. Malware is often executed and analyzed in a sandbox environment by threat intelligence researchers. Malware samples may be applied to a sandbox that are of an unknown classification. Signatures that are available at the date of ingestion fail to properly identify the malware based on a static identification. New families of unknown malware can be ingested that do not match a known signature for network traffic analysis or static analysis. Thus, the malware was written in such a way as to obfuscate its true purpose and avoid anti-virus signatures and heuristics. Changing the obfuscation techniques is often more trivial than changing the communications protocols, because the malware controller and the malware itself have to be modified and tested. Malware is commonly obfuscated specifically to hide these indicator signs in the computer code that facilities communications over a network.

A need therefore exists for techniques for retroactively identifying malware programs when new signatures become available that later match network traffic previously obtained from the sandbox environment.

SUMMARY

Illustrative embodiments of the present invention provide techniques for retroactively identifying malware programs when new signatures become available that later match network traffic previously obtained from the sandbox environment. In one exemplary embodiment, a method comprises the steps of obtaining a plurality of packet capture files comprising previously captured network communications of one or more malware programs that previously executed in a sandbox environment, wherein each of the packet capture files are associated with a corresponding malware program that generated the network communications; obtaining one or more signatures indicative of at least one of the malware programs; comparing the one or more signatures to the plurality of packet capture files; and retroactively identifying a given malware program as malware if one of the signatures matches a given packet capture file associated with the given malware program.

In at least one embodiment, a table identifying known malware programs is updated to include an identifier of the given malware and/or a hash of the given malware. In addition, the table identifying known malware is optionally further updated to include the one signature that matched the given packet capture file and/or a current timestamp. The table identifying known malware programs is optionally stored in a format that can be queried by a user.

In one or more embodiments, a plurality of malware samples that were previously unidentified are correlated with the given malware program based on a scan of additional packet capture files for the one signature that matched the given packet capture file.

These and other illustrative embodiments include, without limitation, methods, apparatus, systems, computer networks and computer program products comprising processor-readable storage media.

DETAILED DESCRIPTION

Illustrative embodiments of the present invention will be described herein with reference to exemplary communication, storage, and processing devices. It is to be appreciated, however, that the invention is not restricted to use with the particular illustrative configurations shown. Aspects of the present invention provide techniques for retroactively identifying malware programs when new signatures become available that later match network traffic previously obtained from the sandbox environment.

In at least one embodiment of the invention, previously unknown malware is classified based on network communications of the malware, such as network communications of the malware captured in a packet capture (pcap) file. The malware families are retroactively identified based on a protocol analysis and a scanning of the stored pcap files. Thereafter, the classification information is added to a database, for example, for use with a web application threat intelligence portal and for clustering of related samples. The pcap files are typically placed in a structured file system that identifies the unique sample.

Figure 1:
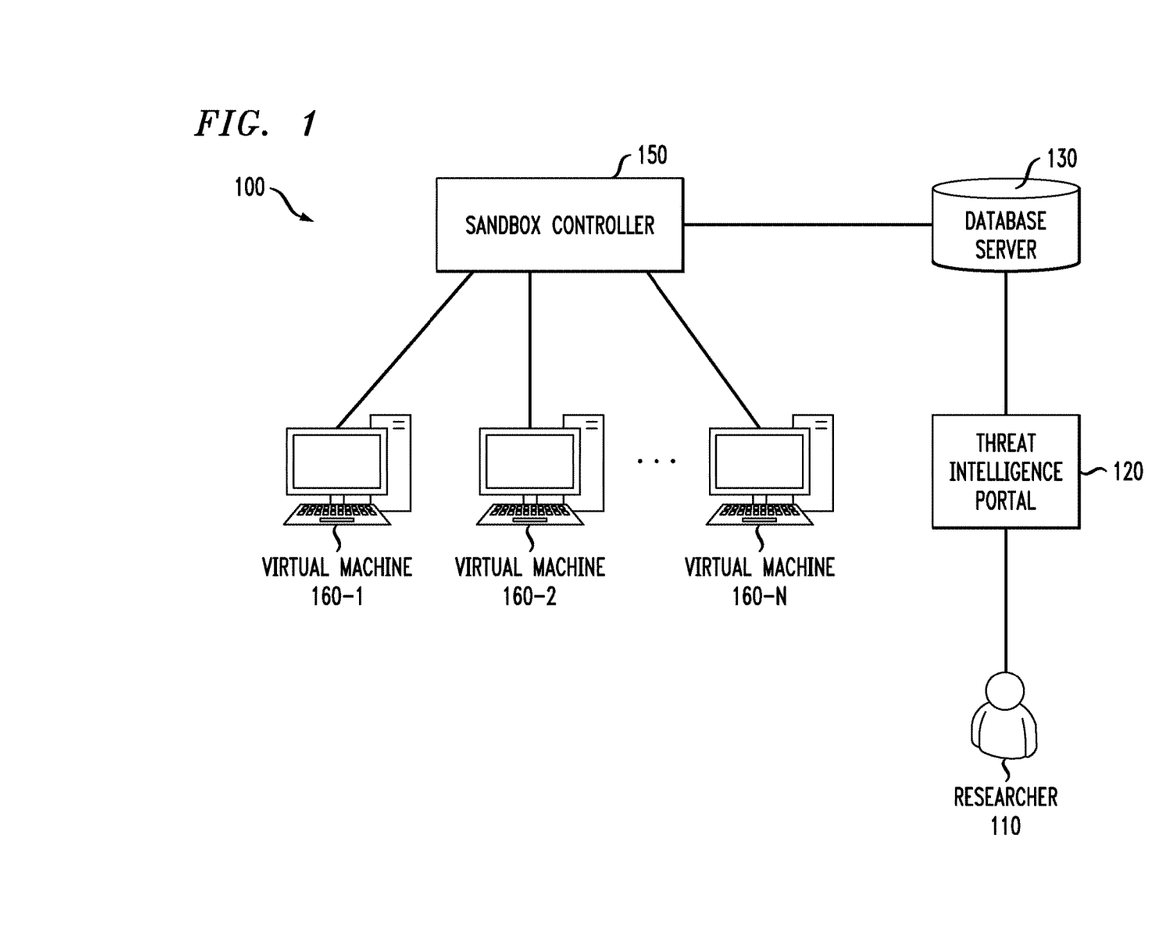
FIG. 1 shows a computer network configured in accordance with an illustrative embodiment of the invention.

FIG. 1 shows a computer network 100 configured in accordance with an illustrative embodiment of the invention. As shown in FIG. 1, a threat intelligence researcher (user) 110 employs a threat intelligence portal 120 to interface with a database server 130. The exemplary threat intelligence portal 120, for example, executes an exemplary retroactive malware identification process 500, discussed further below in conjunction with FIG. 5, that scans pcap files with newly obtained malware signatures to identify previously unknown malware. The exemplary database server 130 maintains a plurality of malware-related databases and results, as discussed further below in conjunction with FIGS. 2-4.

Figure 4:
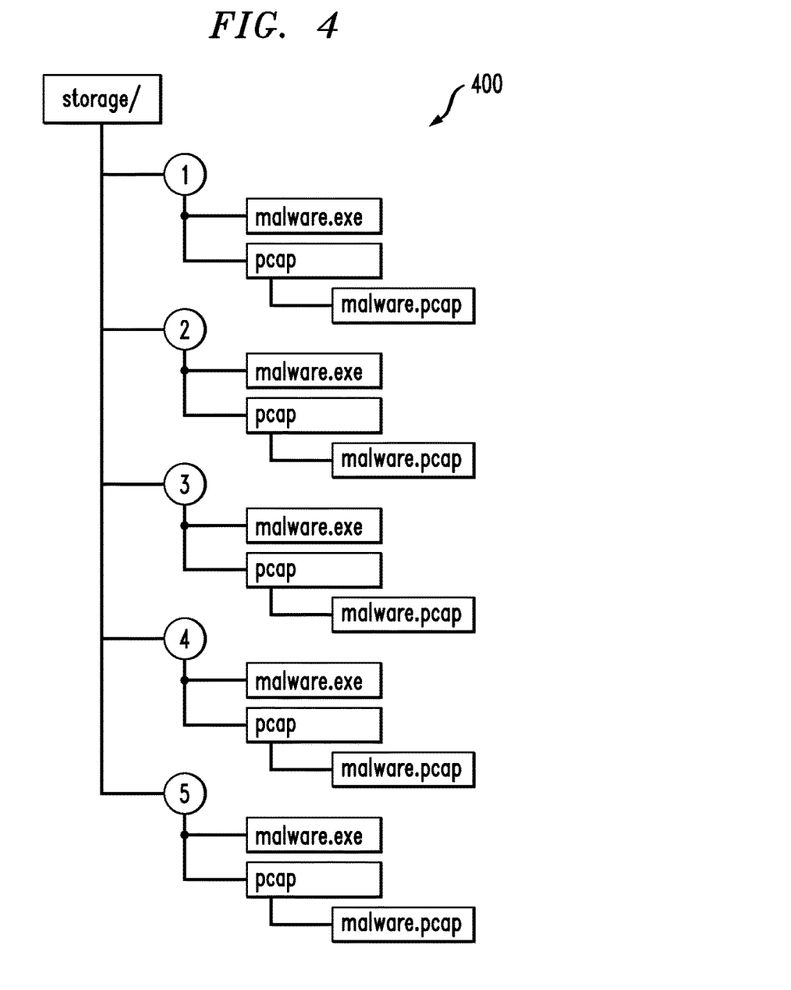
FIG. 4 illustrates an example filesystem layout for sandbox results according to one embodiment of the invention.
Figure 5:
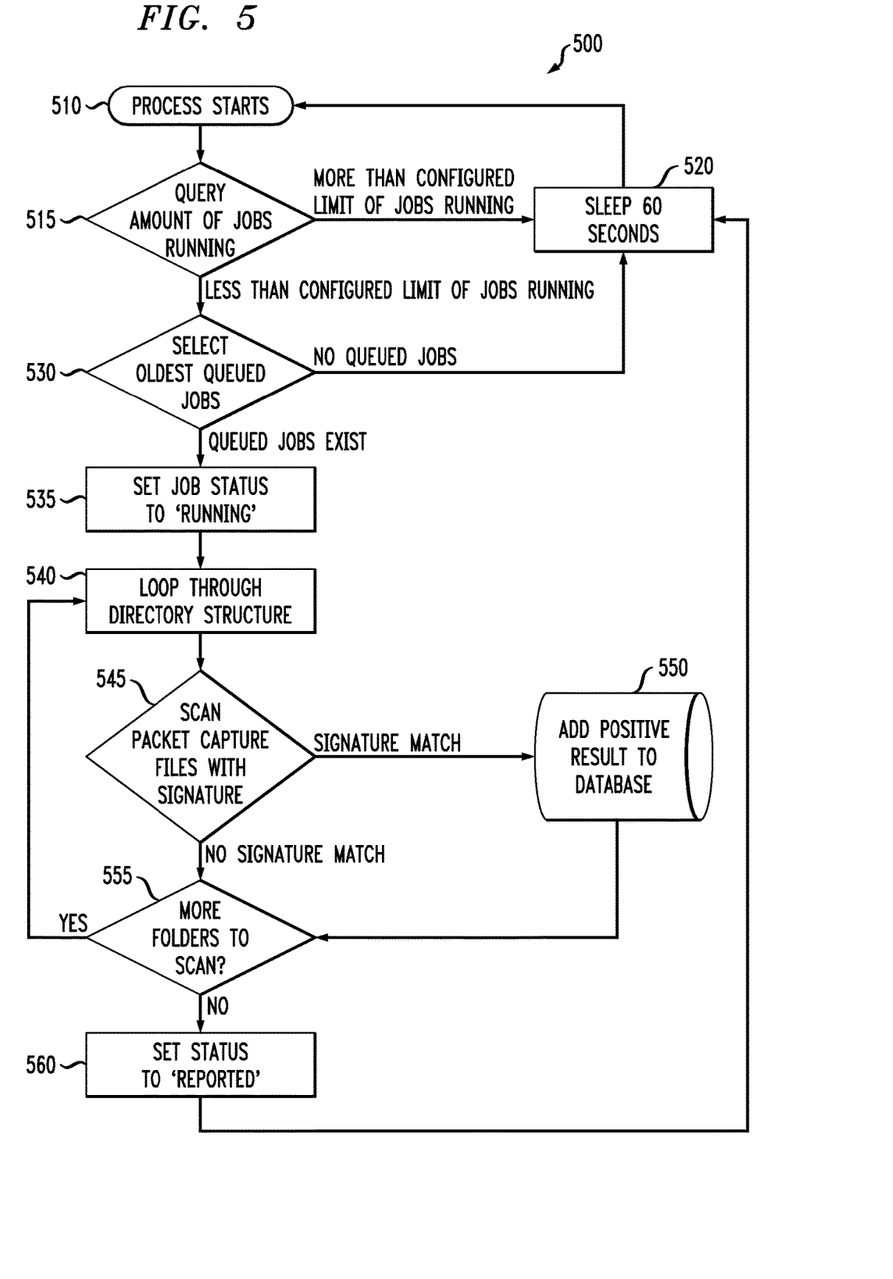
FIG. 5 is a flow chart illustrating an exemplary implementation of the retroactive malware identification process according to one embodiment of the invention.

While the threat intelligence portal 120 executes the exemplary retroactive malware identification process 500 of FIG. 5 in the exemplary embodiments, the retroactive malware identification process 500 can be executed by other processing devices within the computer network 100, as would be apparent to a person of ordinary skill in the art. For example, after a threat intelligence researcher 110 has added a signature via the threat intelligence portal 120, which then inserts the row into the database server 130, the signature scanning performed by the retroactive malware identification process 500 can happen virtually anywhere that the file system that incorporates the filesystem layout 400 of FIG. 4 or where the malware-related databases of FIGS. 2-4 reside.

The exemplary computer network 100 also comprises a sandbox controller 150 and one or more virtual machines 160-1 through 160-N. A virtual machine 160 comprises application software running on a computer that provides a virtual execution environment mimicking an environment of a typical computerized device, such as by providing an operating system and virtual processor and memory resource.

As previously noted, malware is often executed and analyzed in a sandbox environment by threat intelligence researchers. Generally, a sandbox is a protected virtual execution environment comprising the one or more virtual machines 160 running where a file can be safely executed without damaging other applications. The sandbox controller 150 will assign such malware to one or more of the virtual machines 160 and the output of the sandbox is stored on the exemplary database server 130 for analysis by a threat intelligence researcher 110. The sandbox controller 150 is configured in such a way that when the sandbox controller 150 is done processing a sample, the sandbox controller 150 writes the results to a structured file system, as discussed further below in conjunction with FIG. 4. In one or more embodiments, the stored results comprise the malware sample, or a symbolic link to the malware sample elsewhere, and the packet capture (pcap) file, in the same directory or a symbolic link to it elsewhere.

As previously noted, malware samples may be applied to a sandbox that are of an unknown classification. Signatures that are available at the date of ingestion fail to properly identify the malware based on a static identification. New families of unknown malware can be ingested that do not match a known signature for network traffic analysis or static analysis.

The threat intelligence researcher 110 utilizes a web application of the threat intelligence portal 120 to navigate the sandbox results and conduct analysis. When identifying patterns of previously unknown malware are found in stored malware network communications, the threat intelligence researcher 110 can write a signature. The web application will structure this signature and other data, such as username and date and time of entry into one or more tables, as discussed further below in conjunction with FIG. 2, so that the retroactive malware identification process 500 of FIG. 5 can scan the results.

In this manner, one or more embodiments of the invention classify previously unknown malware based on network communications of the malware, such as the network communications of the malware captured in a packet capture (pcap) file and stored in the exemplary database server 130. In this manner, the malware families are retroactively identified based on a protocol analysis and a scanning of the stored pcap files.

At least portions of the computer network 100 may comprise an "enterprise network." Numerous other operating scenarios involving a wide variety of different types and arrangements of processing devices and networks are possible, as will be appreciated by those skilled in the art. The computer network 100 is assumed to comprise a portion of a global computer network such as the Internet, although other types of networks can be part of the network, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising processing devices configured to communicate using IP or other related communication protocols.

Figure 2:
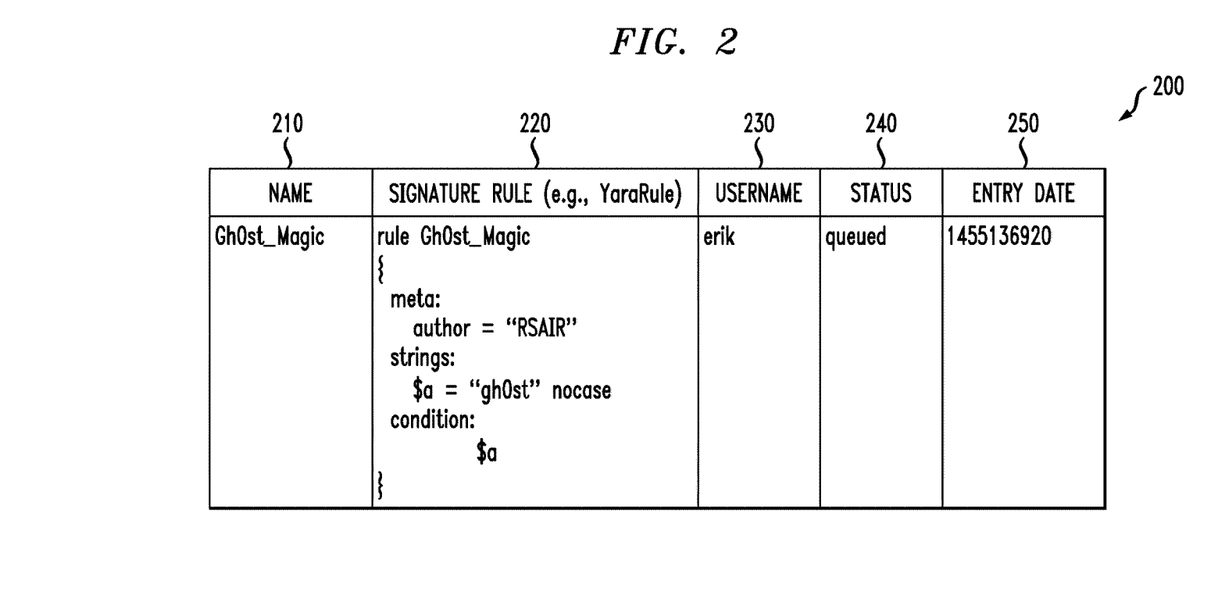
FIG. 2 illustrates an exemplary database schema and example data for a malware signature table according to one embodiment of the invention.

FIG. 2 illustrates an exemplary database schema and example data for a malware signature table 200 according to one embodiment of the invention. The malware signature table 200 is also referred to herein as Table A. The exemplary malware signature table 200 comprises jobs to be executed by the retroactive malware identification process 500. The exemplary malware signature table 200 is used to coordinate the job and queuing system described below and limit the amount of jobs running at any one time. This limit can be tuned to individual storage sub-system performance to attain a substantially maximum throughput for the analysts.

As shown in FIG. 2, the exemplary malware signature table 200 comprises, for each stored signature, a signature name 210, a signature rule 220, such as YARA signatures that identify and classify malware families, an identifier 230 of the analyst that entered the signature, such as a user ID of the threat intelligence researcher 110, a status column 240 (e.g., queued, running or reported) and entry date 250, for example, in an Epoch format, indicating, for example, the date and time that the signature was entered. Generally, YARA signatures provide a description of malware families, such as a pattern or regular expression, based on textual or binary information contained in samples of those malware families.

Figure 3:
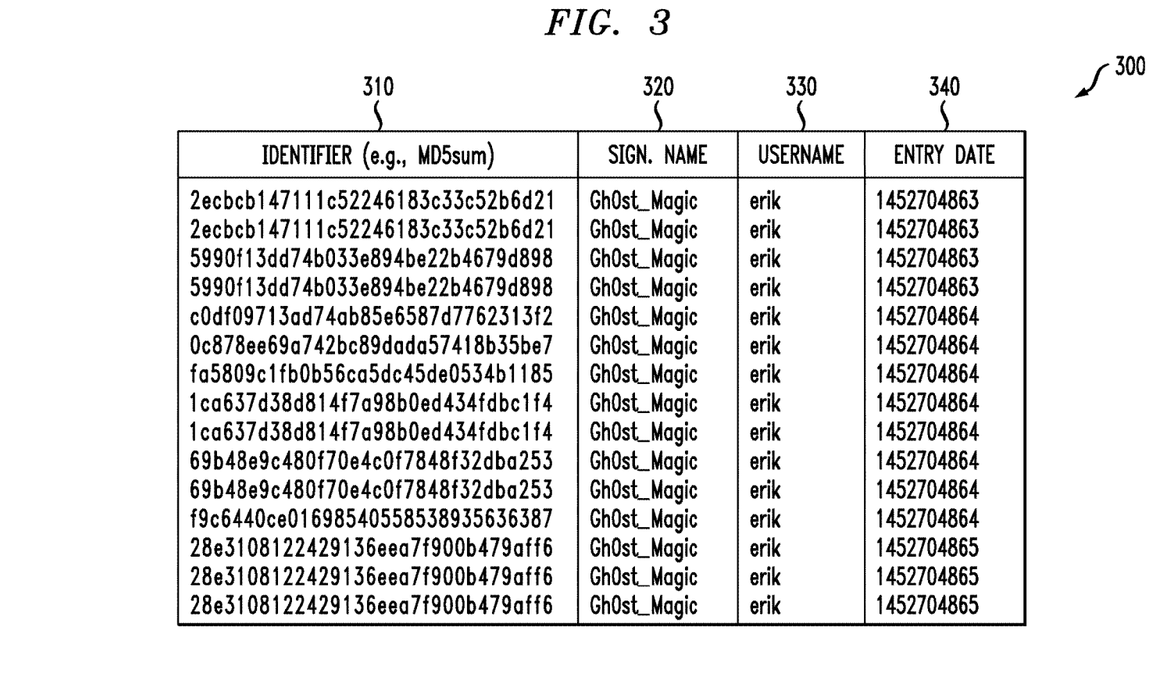
FIG. 3 illustrates an exemplary database schema and example data for a signature matches table according to one embodiment of the invention.

FIG. 3 illustrates an exemplary database schema and example data for a signature matches table 300 according to one embodiment of the invention. The signature matches table 300 is also referred to herein as Table B. Generally, the signature matches table 300 comprises results from the batched scanning jobs by the retroactive malware identification process 500 (FIG. 5) and links the signature matches to the corresponding malware. The results in the signature matches table 300 will be used by the threat intelligence researcher 110 to correlate related samples based on patterns in their network communications.

As shown in FIG. 3, the exemplary signature matches table 300 comprises an identifier 310 of the malware, such as an MD5sum hash value or another hash value, the signature name 320 that gave a positive result, an identifier 330 of the user (e.g., threat intelligence researcher 110) that requested the scan and the entry date 340, such as the date and time when the signature match occurred.

FIG. 4 illustrates an example filesystem layout 400 for sandbox results according to one embodiment of the invention. The exemplary filesystem layout 400 comprises a structured common file system for malware sandbox results that is processed by the retroactive malware identification process 500 of FIG. 5. As shown in FIG. 4, the exemplary filesystem layout 400 comprises a sub-directory 1-5 for each sandbox execution. In the exemplary embodiment of FIG. 4, each sub-directory 1-5 comprises the malware sample (or a symbolic link to the malware sample stored elsewhere), and the packet capture file, pcap file (or a symbolic link to it elsewhere) that was captured for the malware.

FIG. 5 is a flow chart illustrating an exemplary implementation of the retroactive malware identification process 500 according to one embodiment of the invention. Generally, the exemplary retroactive malware identification process 500 scans pcap files from the filesystem layout 400 with newly obtained malware signatures to identify previously unknown malware.

As shown in FIG. 5, the exemplary retroactive malware identification process 500 is initiated during step 510 and a test is performed during step 515 to determine the number of query jobs running. If it is determined during step 515 that more than a configured limit of jobs is running, then the retroactive malware identification process 500 enters a sleep mode during step 520, such as a one minute sleep. If, however, it is determined during step 515 that less than the configured limit of jobs is running, then a further test is performed during step 530 to select the oldest queued jobs during step 530 from the malware signature table 200. If there are no queued jobs, then the retroactive malware identification process 500 enters a sleep mode during step 520, such as a one minute sleep.

If queued jobs exist, then the status of the job is set to a status of "running" during step 535 and the retroactive malware identification process 500 parses the name 210, signature rule 220, identifier 230 and entry date 250 from the malware signature table 200. The retroactive malware identification process 500 then loops through the directory structure of the filesystem layout 400 during step 540. A test is performed during step 545 to scan the packet capture files with the signature(s) 220 of the current job provided from the malware signature table 200 (FIG. 2). If it is determined during step 545 that a signature matches, then a positive result is added to the signature matches table 300 during step 550 that identifies, for example, the malware and the matched signature. Program control proceeds to step 555.

A further test is performed during step 555 to determine if there are more folders to scan in the filesystem layout 400. If there are more folders to scan, then program control returns to step 540 and continues in the manner described above. If there are no more folders to scan, then the status of the job is set to "reported" during step 560 and program control returns to step 520 and continues in the manner described above.

Figure 6:
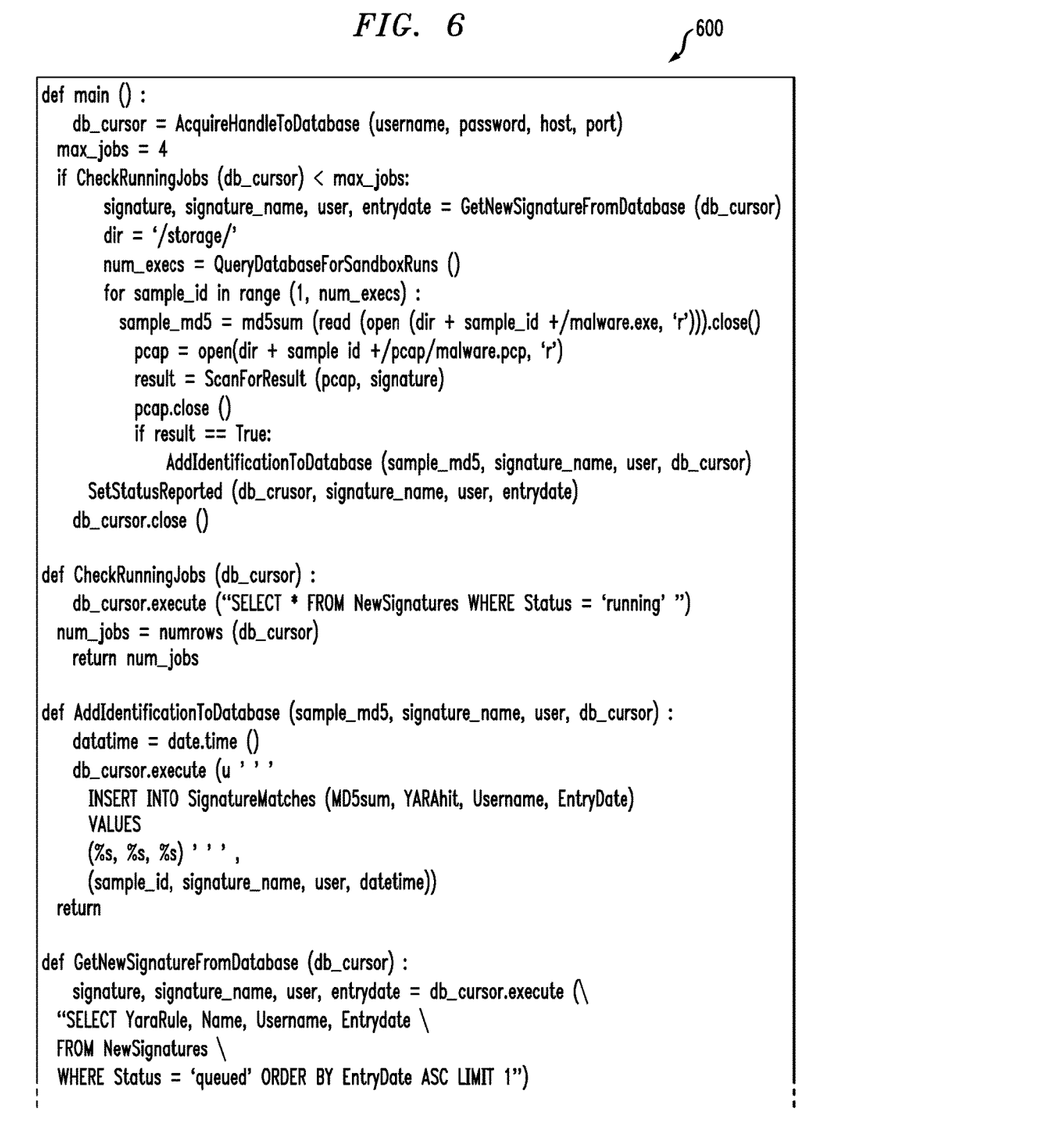
FIG. 6 illustrates exemplary pseudo code corresponding to the retroactive malware identification process of FIG. 5 according to one embodiment of the invention.

FIG. 6 illustrates exemplary pseudo code 600 corresponding to the retroactive malware identification process 500 of FIG. 5 according to one embodiment of the invention. As shown in FIG. 6, the exemplary pseudo code 600 is configured to query the status column 240 from the malware signature table 200 (Table A; FIG. 2) for a value of 'running'. If the number of jobs having a 'running' status is below a configured threshold, the status column 240 is queried for a 'queued' value ordering by the lowest value in the entry date column 250 which is the time the entry was inserted into the malware signature table 200, for example, in an Epoch format. The exemplary pseudo code 600 selects the earliest entry row and parses the mame 210, signature rule 220, entry date 250 and identifier 230 from the row of the malware signature table 200. The exemplary pseudo code 600 is then configured to query the structured filesystem layout 400 for scan result folders and iterates through them progressively. In one or more embodiments, the malware sample from the structured filesystem layout 400 is read and an identifier is obtained, for example, by applying an MD5 hash for identification purposes and the corresponding packet capture files are scanned with the signature names 220 provided from the malware signature table 200.

The exemplary pseudo code 600 can also be configured to skip the MD5 hashing of the malware sample if the structure of the structured filesystem layout 400 is logically laid out and gives identifying information about the malware sample or another database table already has these links and these two tables can be joined together to infer the reference rather than hashing each sample, as would be apparent to a person of ordinary skill in the art.

If a signature matches following the scan, the exemplary signature matches table 300 is updated, for example, with the identifier 310 (e.g., MD5 hash) of the corresponding malware, the signature name 320 of the matching signature, the username 330 of the threat intelligence researcher 110 and the entry date 340. The exemplary pseudo code 600 then queries for the next folder in the filesystem layout 400. If another folder exists, the exemplary pseudo code 600 continues the process, and if there are no more directories to scan, the exemplary pseudo code 600 sets the status column 240 in the malware signature table 200 to 'reported', sleeps for 60 seconds and starts again, as discussed above in conjunction with FIG. 5.

A threat intelligence research 110 can query the results in the signature matches table 300 via a web application of the threat intelligence portal 120 and correlate seemingly unrelated malware samples by their network communications identified by the stored signature name 320.

CONCLUSION

One or more embodiments of the invention provide retroactive malware identification techniques. The foregoing applications and associated embodiments should be considered as illustrative only, and numerous other embodiments can be configured using the techniques disclosed herein, in a wide variety of different applications.

It should also be understood that the retroactive malware identification techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed retroactive malware identification techniques may be implemented using one or more processing platforms. One or more of the processing modules or other components may therefore each run on a computer, storage device or other processing platform element. A given such element may be viewed as an example of what is more generally referred to herein as a "processing device."

Figure 7:
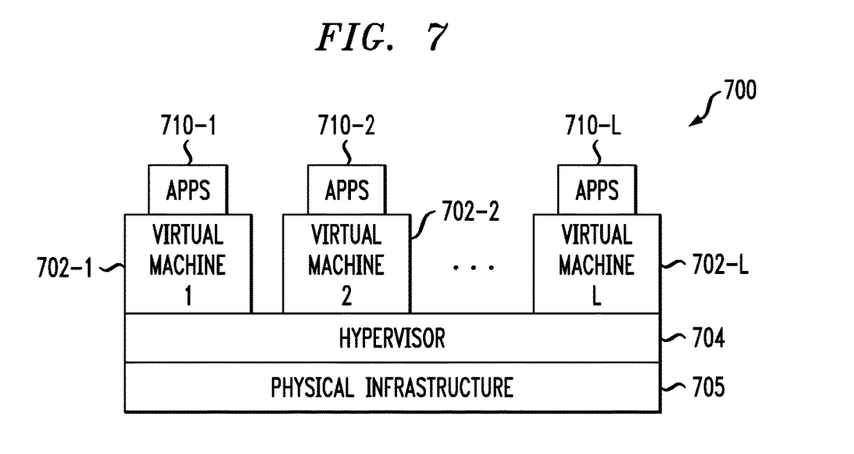
FIG. 7 illustrates an exemplary processing platform that may be used to implement at least a portion of one or more embodiments of the invention comprising a cloud infrastructure.

Referring now to FIG. 7, one possible processing platform that may be used to implement at least a portion of one or more embodiments of the invention comprises cloud infrastructure 700. The cloud infrastructure 700 in this exemplary processing platform comprises virtual machines (VMs) 702-1, 702-2, . . . 702-L implemented using a hypervisor 704. The hypervisor 704 runs on physical infrastructure 705. The cloud infrastructure 700 further comprises sets of applications 710-1, 710-2, . . . 710-L running on respective ones of the virtual machines 702-1, 702-2, . . . 702-L under the control of the hypervisor 704.

The cloud infrastructure 700 may encompass the entire given system or only portions of that given system, such as one or more of client, servers, controllers, or computing devices in the system.

Although only a single hypervisor 704 is shown in the embodiment of FIG. 7, the system may of course include multiple hypervisors each providing a set of virtual machines using at least one underlying physical machine. An example of a commercially available hypervisor platform that may be used to implement hypervisor 704 and possibly other portions of the system in one or more embodiments of the invention is the VMware® vSphere™ which may have an associated virtual infrastructure management system, such as the VMware® vCenter™. The underlying physical machines may comprise one or more distributed processing platforms that include storage products, such as VNX® and Symmetrix VMAX®, both commercially available from EMC Corporation of Hopkinton, Mass. A variety of other storage products may be utilized to implement at least a portion of the system.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

Figure 8:
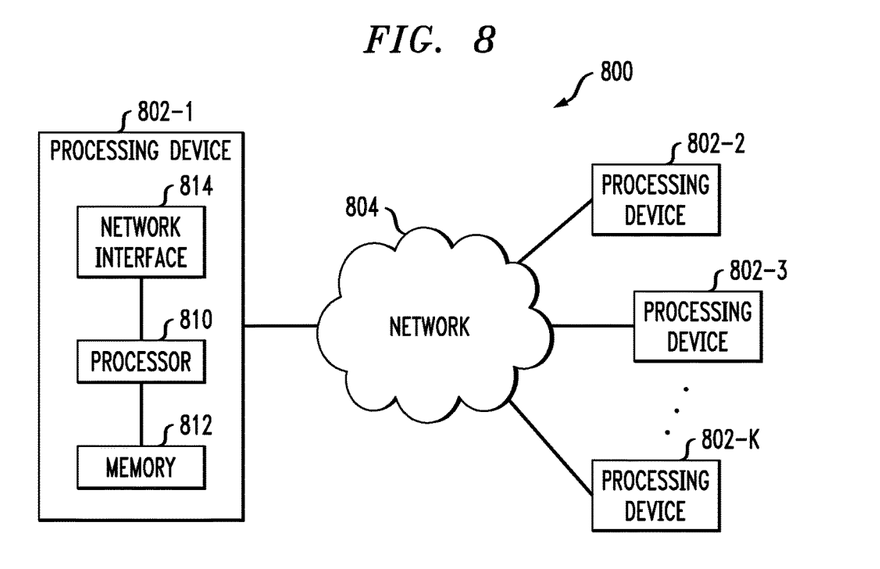
FIG. 8 illustrates another exemplary processing platform that may be used to implement at least a portion of one or more embodiments of the invention.

Another example of a processing platform is processing platform 800 shown in FIG. 8. The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an application specific integrated circuit (ASIC), a field programmable gate array (FPGA) or other type of processing circuitry, as well as portions or combinations of such circuitry elements, and the memory 812, which may be viewed as an example of a "computer program product" having executable computer program code embodied therein, may comprise random access memory (RAM), read only memory (ROM) or other types of memory, in any combination.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 7 or 8, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

Also, it should again be emphasized that the above-described embodiments of the invention are presented for purposes of illustration only. Many variations and other alternative embodiments may be used. For example, the disclosed techniques are applicable to a wide variety of other types of communication systems, storage systems and processing devices. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method, comprising:
    obtaining a plurality of packet capture files comprising previously captured network communications of a plurality of malware programs that previously executed, relative to the obtaining of the plurality of packet capture files, in a sandbox environment, wherein each of said packet capture files is associated with a corresponding malware program that generated said network communications, wherein the packet capture files comprise at least a portion of the network communications of the corresponding malware program while executing in the sandbox environment;
    obtaining one or more signatures indicative of at least one of said malware programs;
    comparing, subsequent to the obtaining of the plurality of packet capture files, said one or more signatures to said plurality of packet capture files; and
    identifying, subsequent to the comparing, a given previously executed malware program as malware if one of said signatures matches a given packet capture file associated with said given malware program, wherein the previous execution of the given malware program is relative to the obtaining of the plurality of packet capture files.

2. The method of claim 1, further comprising the step of updating a table identifying known malware programs to include one or more of an identifier of said given malware and a hash of said given malware.

3. The method of claim 2, further comprising the step of updating said table identifying known malware programs to further include one or more of said one of said signatures that matched said given packet capture file and a current timestamp.

4. The method of claim 2, further comprising the step of storing said table identifying known malware programs in a format that can be queried by a user.

5. The method of claim 1, further comprising the step of correlating a plurality of malware samples that were previously unidentified with said given malware program based on a scan of additional packet capture files for said one of said signatures that matched said given packet capture file.

6. The method of claim 1, wherein said one or more signatures are each mapped to a corresponding one of said malware programs.

7. The method of claim 1, wherein said one or more signatures indicative of said at least one of said malware programs are obtained from an analyst that identified said one or more signatures.

8. A computer program product, comprising a non-transitory machine-readable storage medium having encoded therein executable code of one or more software programs, wherein the one or more software programs when executed by at least one processing device perform the following steps:
   obtaining a plurality of packet capture files comprising previously captured network communications of a plurality of malware programs that previously executed, relative to the obtaining of the plurality of packet capture files, in a sandbox environment, wherein each of said packet capture files is associated with a corresponding malware program that generated said network communications, wherein the packet capture files comprise at least a portion of the network communications of the corresponding malware program while executing in the sandbox environment;
   obtaining one or more signatures indicative of at least one of said malware programs;
   comparing, subsequent to the obtaining of the plurality of packet capture files, said one or more signatures to said plurality of packet capture files; and
   identifying, subsequent to the comparing, a given previously executed malware program as malware if one of said signatures matches a given packet capture file associated with said given malware program, wherein the previous execution of the given malware program is relative to the obtaining of the plurality of packet capture files.

9. The computer program product of claim 8, further comprising the step of updating a table identifying known malware programs to include one or more of an identifier of said given malware and a hash of said given malware.

10. The computer program product of claim 9, further comprising the step of updating said table identifying known malware programs to further include one or more of said one of said signatures that matched said given packet capture file and a current timestamp.

11. The computer program product of claim 9, further comprising the step of storing said table identifying known malware programs in a format that can be queried by a user.

12. The computer program product of claim 8, further comprising the step of correlating a plurality of malware samples that were previously unidentified with said given malware program based on a scan of additional packet capture files for said one of said signatures that matched said given packet capture file.

13. The computer program product of claim 8, wherein said one or more signatures are each mapped to a corresponding one of said malware programs.

14. The computer program product of claim 8, wherein said one or more signatures indicative of said at least one of said malware programs are obtained from an analyst that identified said one or more signatures.

15. A system, comprising:
   a memory; and
   at least one processing device, coupled to the memory, operative to implement the following steps:
   obtaining a plurality of packet capture files comprising previously captured network communications of a plurality of malware programs that previously executed, relative to the obtaining of the plurality of packet capture files, in a sandbox environment, wherein each of said packet capture files is associated with a corresponding malware program that generated said network communications, wherein the packet capture files comprise at least a portion of the network communications of the corresponding malware program while executing in the sandbox environment;
   obtaining one or more signatures indicative of at least one of said malware programs;
   comparing, subsequent to the obtaining of the plurality of packet capture files, said one or more signatures to said plurality of packet capture files; and
   identifying, subsequent to the comparing, a given previously executed malware program as malware if one of said signatures matches a given packet capture file associated with said given malware program, wherein the previous execution of the given malware program is relative to the obtaining of the plurality of packet capture files.

16. The system of claim 15, further comprising the step of updating a table identifying known malware programs to include one or more of an identifier of said given malware and a hash of said given malware.

17. The system of claim 16, further comprising the step of updating said table identifying known malware programs to further include one or more of said one of said signatures that matched said given packet capture file and a current timestamp.

18. The system of claim 15, further comprising the step of correlating a plurality of malware samples that were previously unidentified with said given malware program based on a scan of additional packet capture files for said one of said signatures that matched said given packet capture file.

19. The system of claim 15, wherein said one or more signatures are each mapped to a corresponding one of said malware programs.

20. The system of claim 15, wherein said one or more signatures indicative of said at least one of said malware programs are obtained from an analyst that identified said one or more signatures.

* * * * *